July 24, 1962
J. J. CHRISTENSON ET AL
3,045,848
STRADDLE TRAILER
Filed March 7, 1960
3 Sheets-Sheet 1
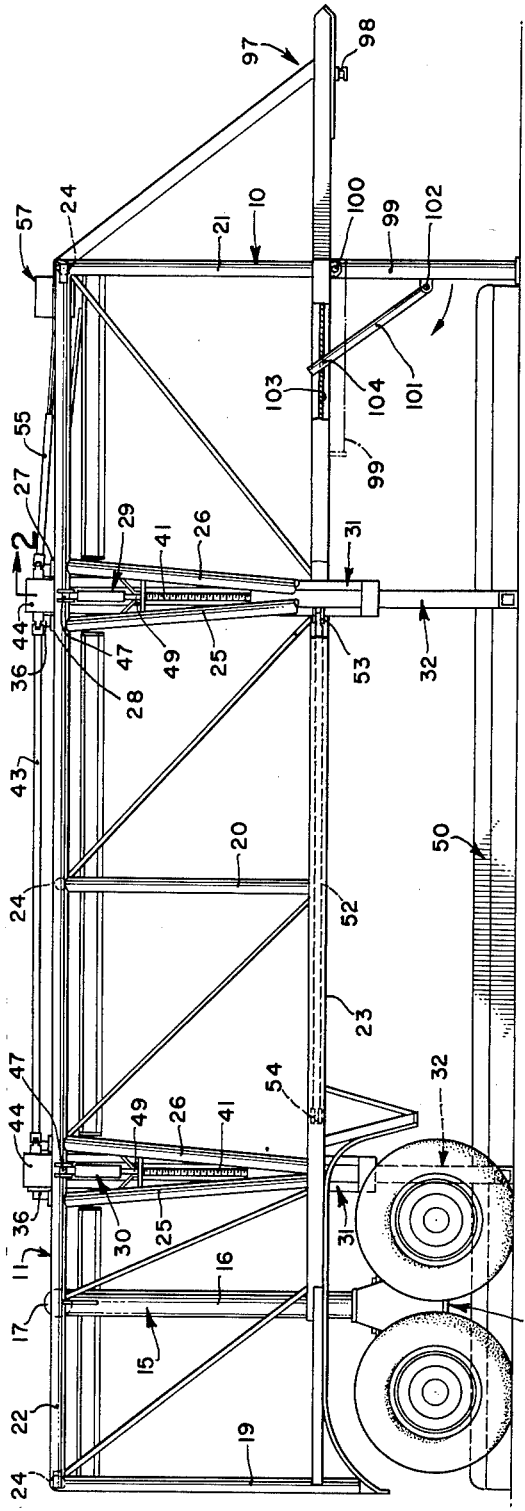
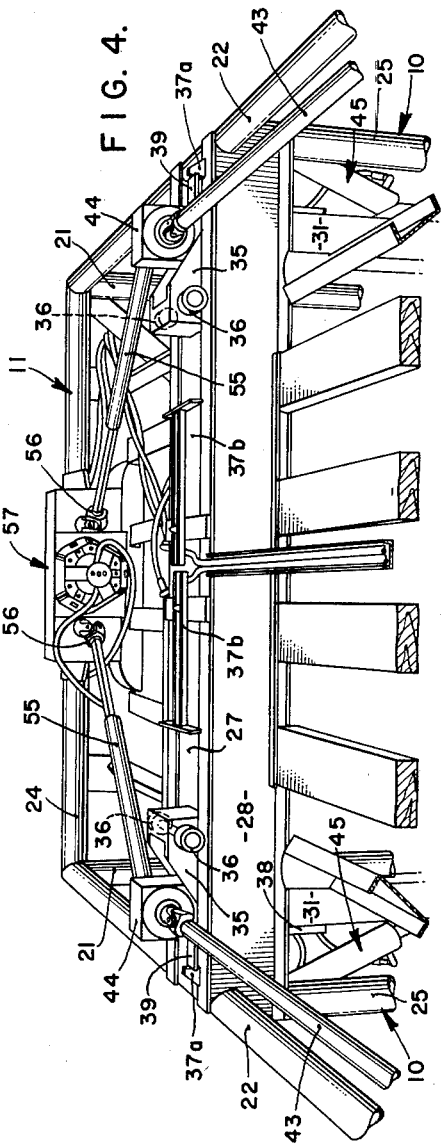
JAMES J. CHRISTENSON
FREDERICK G. MALONEY
*INVENTORS.*
WHANN & MC MANIGAL
ATTORNEYS FOR APPLICANTS July 24, 1962  J. J. CHRISTENSON ET AL  3,045,848
STRADDLE TRAILER
Filed March 7, 1960  3 Sheets-Sheet 2
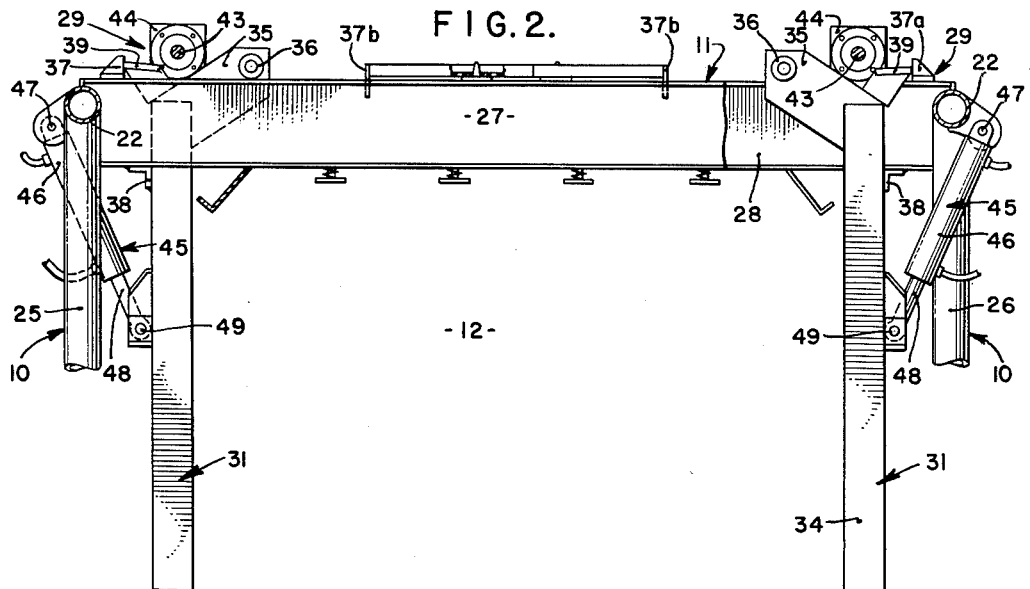
FIG. 2.
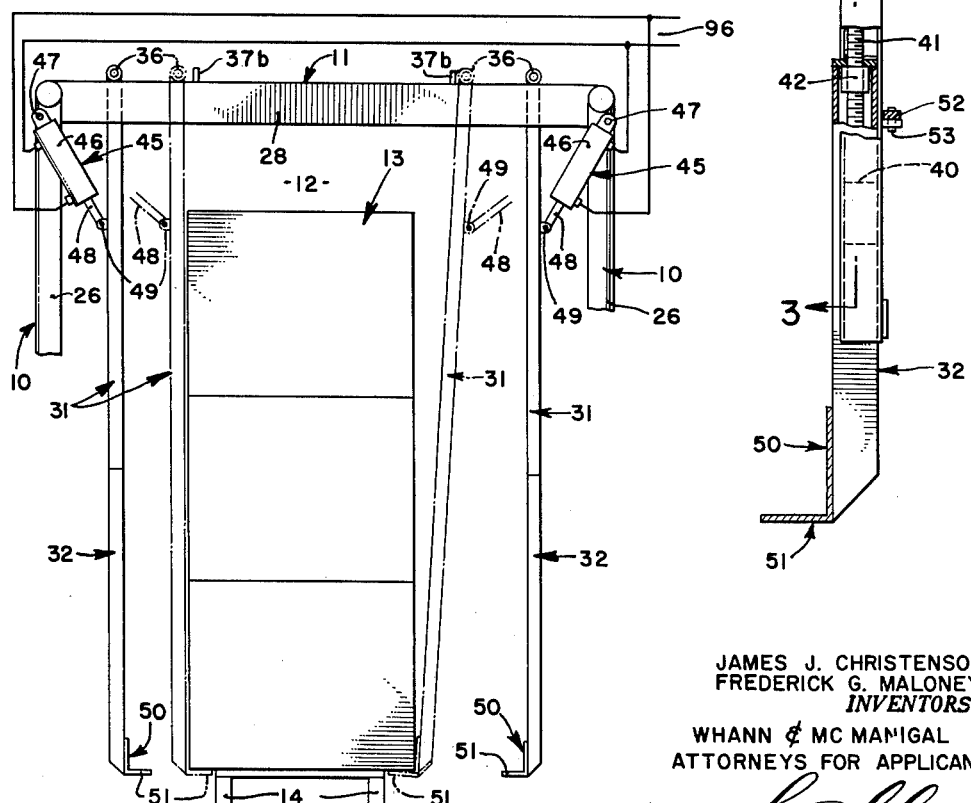
FIG. 7.
JAMES J. CHRISTENSON
FREDERICK G. MALONEY
*INVENTORS.*
WHANN & MC MANIGAL
ATTORNEYS FOR APPLICANTS
BY 

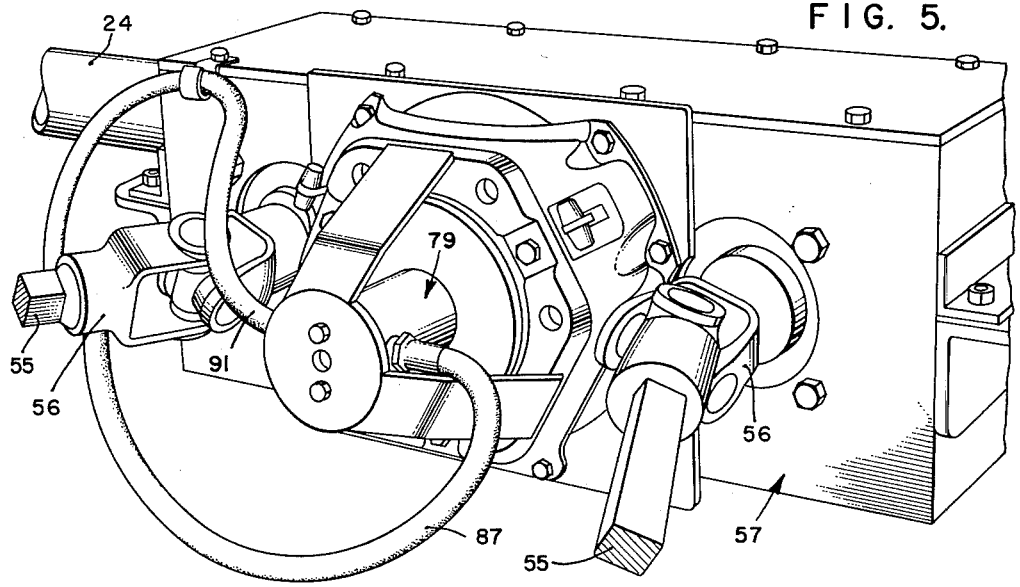
FIG. 5.
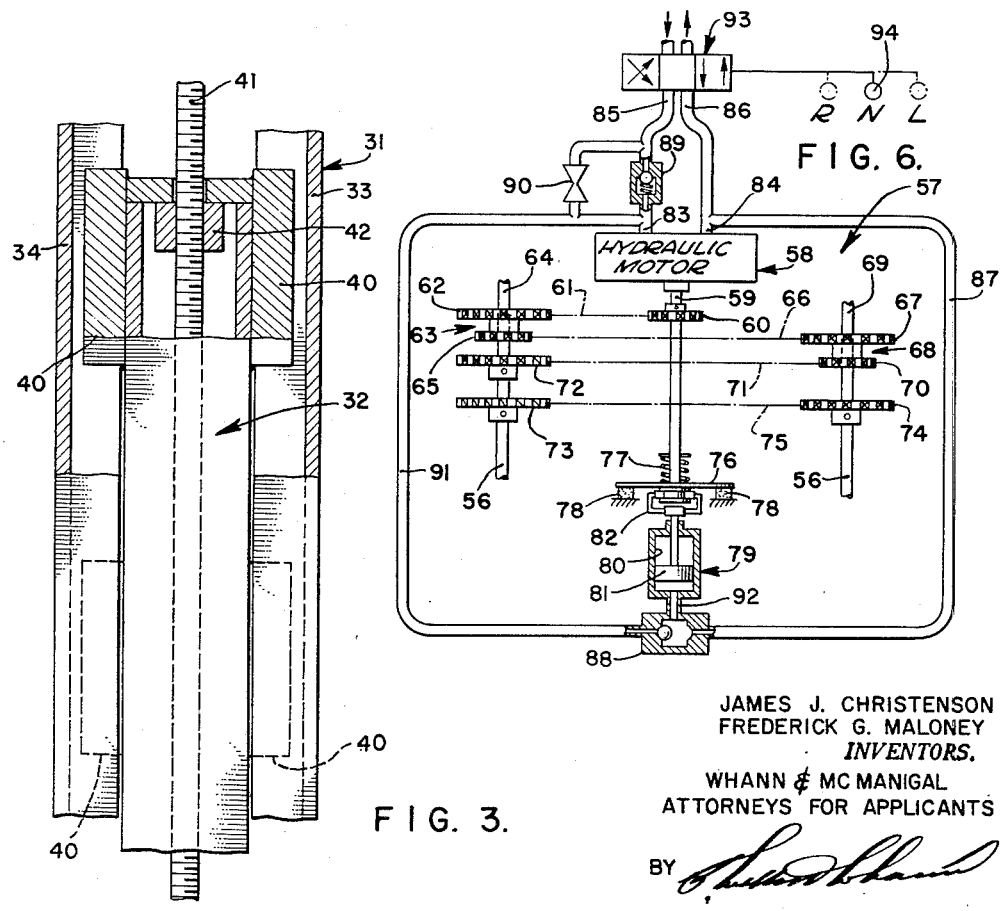
FIG. 3.
FIG. 6.
JAMES J. CHRISTENSON
FREDERICK G. MALONEY
*INVENTORS.*
WHANN & MC MANIGAL
ATTORNEYS FOR APPLICANTS United States Patent Office 3,045,848
Patented July 24, 1962

3,045,848
STRADDLE TRAILER
James J. Christenson, Cowiche, and Frederick G. Maloney, Yakima, Wash., assignors, by direct and mesne assignments, to Towmotor Corporation, Cleveland, Ohio, a corporation of Ohio
Filed Mar. 7, 1960, Ser. No. 13,009
11 Claims. (Cl. 214—392)

The present invention relates generally to wheeled vehicles of the type utilized for the transportation of loads, and is more particularly concerned with a vehicle of the trailer type, commonly referred to as a straddle trailer which is adapted to be moved into a position over the load, and is provided with simple means for engaging and picking up the load so that it may be carried over a highway to a desired point of delivery.

More specifically, the present invention is an improvement upon the straddle carrier disclosed in our Patent No. 2,862,635, issued December 2, 1958.

One object of the invention is to provide a straddle trailer of improved construction and operation, which is capable of handling greater load capacities, and which is so constructed that it will handle greater load widths and permit increased hoist travel.

A further object resides in the provision of load carrying instrumentalities of novel construction which are so constructed and coact in such a manner as to automatically center a load which may be picked up off center, and wherein greater flexibility of control is obtained, and the load may be raised and lowered with smooth even action.

A still further object is to provide novel power actuating means and driving mechanism for engaging, raising and lowering, and transporting of the load.

Still another object is to provide novel control for the hydraulic power actuating device, which includes an automatically controlled braking mechanism for holding the load during such time as the power device is deenergized, but automatically being released when the power device is energized for raising or lowering of the load.

Yet another object is to provide a novel folding support for the front end of the trailer, when the hauling tractor is uncoupled.

Further objects and advantages of the invention may be brought out in the following part of the specification wherein the parts of the embodiment are explained in detail for the purpose of providing a complete and readily understood disclosure without, however, intending to limit the scope of the invention which is defined by the appended claims.

Referring to the accompanying drawings which are for illustrative purposes only:

FIG. 1 is a side elevational view of a straddle trailer embodying the features of the present invention;

FIG. 2 is an enlarged fragmentary transverse section of the same, taken substantially on line 2—2 of FIG. 1;

FIG. 3 is an enlarged fragmentary detail view of the slide mounting of the mast structure, as viewed along line 3—3 of FIG. 2;

FIG. 4 is a fragmentary top perspective view showing details of the hydraulic motor and its driving connections with the load engaging and lifting mechanism;

FIG. 5 is an enlarged fragmentary perspective view of the hydraulic power device, showing details of the brake mechanism;

FIG. 6 is a view diagrammatically illustrating the hydraulic power device and control therefor; and FIG. 7 is a view diagrammatically illustrating the operation of the load carrying means in centering a load which is picked up off center.

Referring now more specifically to the drawings, for illustrative purposes the straddle trailer of the present invention is shown as comprising a framework of open construction, which is fabricated to provide parallel vertical side walls 10—10 and a horizontal top wall 11 which cooperate to define a longitudinally elongated load receiving chamber 12 which is open along its bottom and at its rear end, so as to permit the trailer being backed into position over a load, for example, consisting of a stack or pile of boxes 13 supported on pallets or stringers 14 on a supporting surface.

The frame structure includes a main arch 15 consisting of a pair of heavy posts 16 made of steel pipes of comparatively large diameter and which are incorporated respectively in the side walls 10. The uppermost ends of the posts 16 are welded or otherwise suitably secured to the ends of a cross member 17 which is included in the top wall structure 11. The main arch 15 forms an extremely rigid and strong structure at the rear end of the framework, this main arch having the lowermost ends of the posts 16 respectively associated with a tandem wheel structure, as generally indicated by the numeral 18.

As shown in FIG. 1, each side wall 10 includes a rear upright 19, center upright 20 and front upright 21 of steel tubes which are welded at their uppermost ends to a tubular top stringer 22 which extends the full length of the framework. At their lowermost ends, the uprights 19, 20 and 21 are secured to an I-beam stringer 23. At the uppermost end of these uprights, a tubular cross member 24 is connected between the top stringers 22—22 and forms a part of the top wall structure of the framework. The stringers are also rigidly connected with the main arch structure 15.

The framework is further strengthened and rigidified in the side walls and top wall between the center upright 20 and the rear upright 19, as well as between this center upright and the front upright 21 to take care of the load forces imposed upon the framework by the load lifting and supporting system which will subsequently be described. As shown in FIG. 1, the side walls at the positions mentioned above are provided with upwardly diverging tubular steel upright load supports 25 and 26 which have their contiguous lowermost ends secured to the stringer 23 and their spaced apart upper ends welded to the top stringer 22. Extending between the uppermost ends of the uprights 25 and 26 and forming a part of the top wall structure are a pair of spaced apart I-beams 27 and 28 in parallel relation and with their ends respectively welded or otherwise secured to the top stringers 22—22 as well as the uppermost end portions of the upright 25 and 26, as shown in FIGS. 2 and 4.

The load lifting and supporting system embodies a forward load supporting assembly 29 and a rearward load supporting assembly 30. Since the load supporting assemblies are similarly constructed, it is believed that a detail description of the forward load supporting assembly will suffice to understand the details of construction. As shown in FIG. 2, the forward load supporting assembly comprises a pair of depending mast structures 31 which each carry a slide member 32 at its lowermost end. The mast structure in each case is comprised of facing channel members 33 and 34 which have their uppermost ends extending between the I-beams 27 and 28 and connected to a carriage 35 fitted with side rollers 36 having rolling engagement with the upper flanges of the I-beams 27 and 28 respectively so as to enable transverse movement of the mast structures with respect to the framework between an outer stop member 37a and an inner adjustable stop member 37b. The mast structure 31 is also swingable about the rollers 36 between limits which are established by a pad member 38 arranged to abut the lowermost flanges of the I-beams, when the mast structure is swung in one direction, and a pad member 39 on the carriage which is adapted to engage the uppermost flanges of the I-beams, when the mast structure is swung in the opposite direction.

As shown in FIG. 3, the uppermost end of the slide member 32 is slidably supported in the channel members 33 and 34 by slide blocks or rollers 40 to permit longitudinal movement of the slide to extended and retracted positions with respect to the mast structure. This movement of the slide is effected by means of an elongate screw 41 having its lowermost end threadedly engaged with a nut 42 which is adapted to abut the upper end of the slide 32. It will be observed that with this arrangement, the screw 41 can only produce a lifting force on the slide 32.

The uppermost end of the screw 41 has a driving connection with a main drive shaft 43 through a right angle one-to-one ratio gear box 44 which is mounted on and carried by each of the carriages 35. Transverse movement of the carriage 35, and swinging movement of the mast structure 31 is accomplished by means of a hydraulic actuator 45 in each case which comprises a cylinder 46 which is hinged at 47 to the stringer 22, and a double acting piston which is connected through a piston rod 48 and hinge connection 49 to the mast structure 31 at a point below the pad member 38.

The lowermost ends of the slide members 32 of the forward and rear load supporting assemblies lying adjacent each side wall 10 are interconnected by an angle bar 50 which is positioned with one of its flanges, as indicated at 51, extending horizontally and projecting inwardly to form a lifting ledge for engaging under a box, pallet or other means constituting the load. In order to prevent forward and backward swinging movement of the mast structures adjacent each side wall, which are interconnected by the angle bar 50, a tie rod 52 is provided, this tie rod having an end connection 53 with the mast structure of a forward load supporting assembly, and its other end 54 hingedly connected with the I-beam stringer 23 at a point of the rearward load supporting assembly. These tie rods, however, do not interfere with the movements of the mast structures.

As shown in FIG. 4, the main drive shafts 43 along each side of the top wall are respectively connected through a universal drive shaft 55 with separate power take-offs 56 of a hydraulic power mechanism as generally indicated at 57. Since the gear boxes 44 are mounted on the movable carriages 35, driving of the main shafts 43 in the different positions of the carriages is accomplished by making the drive shafts 55 telescopic so that they may be shortened and lengthened during the shifting movements of the carriages. Referring now more specifically to FIGS. 5 and 6, the hydraulic power mechanism comprises a hydraulic motor 58 which is diagrammatically illustrated in FIG. 6 as having a main drive shaft 59 which connects through a chain driven speed reduction to drive the two power take-offs 56—56. For this purpose, the main shaft 59 carries a sprocket 60 having a driving connection through a chain 61 with one sprocket 62 of a double sprocket 63 which is rotatably mounted on a jack shaft 64. The other sprocket 65 drives through a chain 66 having connection with a sprocket 67 of the double sprocket 68 which is rotatably mounted on a jack shaft 69. The other sprocket 70 of this double sprocket assembly is connected through a chain 71 with a driving sprocket 72 secured to and rotatable with the jack shaft 64. A second sprocket 73 rotatable with the jack shaft 64, and a similar sprocket 74 mounted for rotation with the jack shaft 69 are interconnected by a chain 75 so that the jack shafts 64 and 69 have similar directions of rotation, with the result that the universal drive shafts 55 connected to the power take-offs 56 will likewise have the same forward and reversed directions of rotation.

In order to support the lifted load in elevated position during transportation, and when the hydraulic motor is deenergized, a braking device is provided for automatically holding the shaft 59 against rotation, except when the hydraulic motor is energized. As diagrammatically shown in FIG. 6, the shaft 59 carries a brake disc 76 which is rotatable with the shaft, but is axially slidable thereon. The brake disc 76 is normally biased by a spring 77 into braking engagement with a stationary fixed braking member 78. For releasing the brake there is provided a hydraulic actuator 79 which comprises a cylinder 80 and a single acting piston 81 having an operative connection through a yoke 82 with the brake disc 76, so that when a hydraulic fluid is supplied to the inlet end of the cylinder 80, the piston will move the brake disc 76 against the action of spring 77 to a non-braking position.

The hydraulic control for the motor and braking device will now be described. As schematically illustrated in FIG. 6, the hydraulic motor 58 is provided with a pair of conduit connection terminals 83 and 84, which are respectively connected to supply conduits 85 and 86. The conduit 86 is connected by means of a conduit 87 with one end of a double check valve 88. The conduit 85 has provided therein a check valve 89 which is shunted by a restricted flow by-pass 90. The outlet side of the check valve 89 is connected through a conduit 91 with the other end of the double check valve 88, and a branch connection 92 of the double check valve feeds into the inlet connection of the cylinder 80. Control of the hydraulic motor is attained by means of a reversing valve 93 of conventional construction, this valve being inserted to control the connection of a pressurized fluid source with the conduits 85 and 86, and the valve being arranged to have "raising," "neutral" and "lowering" positions as indicated respectively by the letters R, N and L.

The valve 93 is shown in its neutral position. Assuming now that it is desired to actuate the hydraulic motor in a raising direction, the valve is actuated by moving its operating handle 94 to the R position. This admits fluid under pressure to the conduit 85 and permits outflow through the conduit 86. When fluid pressure is thus applied to the hydraulic motor it is energized to operate in a raising direction. Simultaneously, fluid pressure is applied through conduit 91 to the double check valve 88 which moves its valve member 95 to the right so as to cut off fluid flow through conduit 87, but permit fluid to pass through the branch connection 92 into the cylinder 80. The application of pressure against the piston 81 operates to move the brake disc 76 to non-braking position so as to permit rotation of the main driving shaft 59. Should it now be desired to operate the hydraulic motor in a lowering direction, the valve handle 94 is moved to the L position so as to now connect the fluid pressure inlet with conduit 86, and the outlet through conduit 85. With the valve in this position, fluid pressure is applied through the conduit 87 to the double check valve 88. The valve 95 is moved to the opposite end of the check valve and closes flow with respect to conduit 91, but permits fluid pressure to enter through the branch connection 92 into the cylinder 80 to again release the brake. During operation of the hydraulic motor in a lowering direction, the outlet flow from terminal 83 will close the check valve 89 and force the outlet fluid to pass through the restricted by-pass 90 so as to maintain a sufficient back pressure to energize the hydraulic actuator 79 and hold the brake in non-braking position under all load conditions during actuation of the hydraulic motor in a lowering direction. In the neutral position of the valve 93, fluid pressure in all the conduits drops to zero and the spring 77 acts to automatically bias the brake disc 76 into braking position.

One of the important features of the load supporting assembly resides in the flexibility of the mechanism to pick up a load when the frame structure is not centered over the load. That is, when the load is laterally displaced from the central axis of the load receiving chamber, and in the use of the force of gravity acting through the hydraulic actuators 45 to automatically center the load with respect to the longitudinal axis of the load receiving chamber. This important feature will now be explained, reference being had to FIG. 7 which diagrammatically illustrates the action which takes place.

Let it be assumed that the load, as represented by the boxes 13 is displaced to the left of the longitudinal center line of the load chamber, or in other words is not midway between the side walls 10—10. It will be observed that the hydraulic cylinders 46 are connected in parallel to a hydraulic source 96, and that by means of suitable control valves the fluid pressure may be selectively applied to either end of the cylinders 46. If pressure is now applied to the upper ends of the cylinders 46, the left hand mast 31 will be moved inwardly from its full line position to its dotted line position wherein it will engage the load boxes, and the flange 51 will be positioned under the adjacent lower edge of the boxes. During this movement, the carriage support for this mast will roll inwardly along the supporting I-beams 27 and 28 in a direction towards the associated stop 37b.

Energization of the right hand cylinder 46 will move the right hand mast 31 inwardly until its associated inner stop 37b is engaged, whereupon the mast will then be swung to the dotted line position in which the flange 51 at the lowermost end thereof will be placed under the adjacent lower edge of the load boxes, as shown.

Under normal level conditions, if the load is now lifted clear of the ground, the action of gravity will operate to swing the load towards the central axis, and the pressure in the right hand cylinder will transfer to the left hand cylinder so that the horizontal component of the force from the left hand cylinder is greater than the inwardly acting force at the flange 51 exerted by the right hand cylinder. This causes the left hand cylinder to force the right hand piston back even though the same pressure is applied to both cylinders. When the load is centered, both masts will have their carriages abutting the inner associated stops 37b with the pads 38 in contact with the I-beams. In the event that the load is on a slope, gravity will tend to hold the load in the off center position, when lifted clear of the ground. However upon applying pressure to the right and left hand cylinders as explained above, the load will be centered as explained.

The forward end of the frame structure is provided with a tongue structure 97 which is fitted with a conventional hitch pin 98 by which the trailer may be connected with a tractor. Since there is nothing to support the forward end of the frame structure, when the tractor is disconnected, means must be provided for supporting the forward end of the tractor under such conditions. For this purpose, a foldable leg 99 is connected at its uppermost end to the forward end of the stringer 23 by a hinge connection 100 which permits the leg to be swung into an extended position as shown in full lines in FIG. 1, or a folded position as shown in dotted lines in which it lies parallel along the under side of the stringer 23. Associated with the leg 99 is an angle brace 101 which is connected at one end by hinge connection 102 to the leg 99. The other end of the angle brace 101 extends upwardly through an opening 103 in the stringer 23 so as to enable axial movement of the angle brace therethrough, when the leg 99 is moved to folded position, in which position the angle brace may then be swung so as to lie along the stringer and retain the leg in folded position. When the leg is in extended position of use, a pin inserted in an opening 104 of the angle brace opposes longitudinal movement in the opening 103 and retains the leg in extended position. The forward end of the frame structure is rocked onto the legs by backing the tractor with the legs in lowered position.

Various modifications may suggest themselves to those skilled in the art without departing from the spirit of our invention, and, hence, we do not wish to be restricted to the specific form shown or uses mentioned, except to the extent indicated in the appended claims.

We claim:

1. In a vehicle of the character described: a wheeled frame structure including a top wall and side walls defining a load carrying chamber; mast structures disposed adjacent said side walls, said mast structures at the respective side walls depending from said top wall and being pivotally supported at their uppermost ends on a movable carriage for accommodating the spacing between the upper ends of the mast structure to the load width and enabling swinging movement of their lowermost ends towards and away from the central plane of said chamber; load lifting means carried by each of said masts including a slide member guidingly supported thereon for raising and lowering movement and having a projecting ledge for engaging a load; means for moving said mast structures; and power actuated means operable to simultaneously raise and lower said slide members.

2. In a vehicle of the character described: a wheeled frame structure including a top wall and side walls defining a load carrying chamber; mast structures disposed adjacent said side walls, said mast structures depending from said top wall and at each side wall being pivotally supported at their uppermost ends on independent carriages for both bodily movement and swinging movement of their lowermost ends, towards and away from the central plane of said chamber; load lifting means carried by each of said masts including a slide member guidingly supported thereon for raising and lowering movement and having a projecting ledge for engaging a load; means for moving said mast structures; and means operable to simultaneously raise and lower said slide members including a rotary fluid actuated power delivery device.

3. In a vehicle of the character described: a wheeled frame structure including a top wall and side walls defining a load carrying chamber; at least one pair of load carrying mast structures depending from said top wall into said chamber, and being respectively disposed on opposite sides of a central axis of said chamber for engaging and supporting a load therebetween; a carriage at the uppermost end of each of said mast structures upon which the mast structure is supported for limited swinging movement of its lowermost end from a position substantially vertically below said carriage to a position inwardly displaced towards said central axes, said carriages being supported for independent transverse movements with respect to said frame structure; and power means energizable to swing each of said masts and move its associated carriage.

4. In a vehicle of the character described: a wheeled frame structure including a top wall and side walls defining a load carrying chamber; at least one pair of load carrying mast structures depending from said top wall into said chamber, and being respectively disposed on opposite sides of a central axis of said chamber for engaging and supporting a load therebetween; a carriage at the uppermost end of each of said mast structures upon which the mast structure is supported for limited swinging movement of its lowermost end from a position substantially vertically below said carriage to a position inwardly displaced towards said central axis; rolling elements supporting each of said carriages for independent transverse movements with respect to said frame structure; and power means energizable to swing each of said masts and move its associated carriage.

5. In a vehicle of the character described: a wheeled frame structure including a top wall and side walls defining a load carrying chamber; at least one pair of load carrying mast structures depending from said top wall into said chamber, and being respectively disposed on opposite sides of a central axis of said chamber, each of said mast structures including a slide member guidingly supported thereon for raising and lowering movement and having a projecting ledge for engaging a load; rotatable screw means carried by each mast structure for raising and lowering the associated slide member; a carriage at the uppermost end of each of said mast structures upon which the mast structure is supported for limited swinging movement of its lowermost end from a position substantially vertically below said carriage to a position inwardly displaced towards said central axis, said carriage being wheel supported for transverse movements with respect to said frame structure; means independently operable to swing each of said mast structures and move its associated carriage to accommodate its position and the associated projecting ledge with respect to the width of said load; and power means having driving connections with the screw means of said mast structures, said driving connections for the mast structure on each side being movable with the associated carriage thereof, whereby said screw means may be operated simultaneously to raise and lower the load.

6. In a vehicle of the character described: a wheeled frame structure including a top wall and side walls defining a load carrying chamber; at least one pair of load carrying mast structures depending from said top wall into said chamber, and being respectively disposed on opposite sides of a central axis of said chamber, each of said mast structures including a slide member guidingly supported thereon for raising and lowering movement and having a projecting ledge for engaging a load; rotatable screw means carried by each mast structure for raising and lowering the associated slide member; a carriage at the uppermost end of each of said mast structures upon which the mast structure is supported for limited swinging movement of its lowermost end from a position substantially vertically below said carriage to a position inwardly displaced towards said central axis, said carriage being wheel supported for transverse movements with respect to said frame structure; means independently operable to swing each of said mast structures and move its associated carriage to accommodate its position and the associated projecting ledge with respect to the width of said load; and a power delivery device having driving connections with each of said screw means through an angle drive mechanism mounted on and movable with each of said carriages, whereby said screw means may be operated simultaneously to raise and lower the load.

7. In a vehicle of the character described: a wheeled frame structure including a top wall and side walls defining a load carrying chamber; a pair of load carrying mast structures depending from said top wall into said chamber, and being respectively disposed on opposite sides of a central plane of said chamber for engaging a load placed therebetween; means supporting each of said masts at its uppermost end for movements transversely of said frame structure, and for pivotal swinging movement about its uppermost end; stops for respectively limiting said transverse movement of said mast in a direction towards said central plane; a hydraulic actuator connected between a point adjacent the uppermost end of each mast structure and adjacent frame structure, operable upon energization to move the uppermost end of the mast structure towards its associated stop when spaced therefrom, and upon engagement with said stop to pivotally swing the mast so as to move its lowermost end towards said central plane; and means for simultaneously energizing said actuators from a pressurized fluid source, and said actuators coacting under the force of gravity on said load to center the load carried by said mast structures.

8. In a vehicle of the character described: a wheeled frame structure including a top wall and side walls defining a load carrying chamber; adjustable mast structures depending from said top wall adjacent said side walls, each of said mast structures including a load engaging slide member supported thereon for raising and lowering movements; rotary fluid pressure operated power means having an actuating connection with said slide members and being selectively operable in reversed directions of rotation to raise and lower said slide members; a fluid source; valve means for selectively connecting said power means to said power source for reversed directions of rotation; braking means normally in a braking position opposing rotation of said power means, when said power means are deenergized; and means responsive to energization of said power means for actuating said braking means to non-braking position.

9. In a vehicle of the character described: a wheeled frame structure including a top wall and side walls defining a load carrying chamber; adjustable mast structures depending from said top wall adjacent said side walls, each of said mast structures including a load engaging slide member supported thereon for raising and lowering movements; rotary fluid pressure operated power means having an actuating connection with said slide members and being selectively operable in reversed directions of rotation to raise and lower said slide members; a fluid source; valve means for selectively connecting said power means to said power source for reversed directions of rotation; braking means having braking and non-braking positions with respect to said power means, and being normally biased to braking position; and a fluid actuator for said braking means energizable to move said braking means to non-braking position in response to energization of said power means.

10. In a vehicle of the character described: a wheeled frame structure including a top wall and side walls defining a load carrying chamber; adjustable mast structures depending from said top wall adjacent said side walls, each of said mast structures including a load engaging slide member supported thereon for raising and lowering movements; reversible rotary fluid pressure operated power means having a driving connection with said slide members, and a pair of terminal connections for a pressurized operating fluid; braking means for said power mean normally biased towards a braking position; a fluid cylinder-piston actuator energizable to move said braking means to non-braking position; a double check valve having main connections respectively with said pair of terminal connections, and a branch connection with the cylinder of said actuator; and valve means for selectively reversing the connection of said terminal connections with a fluid source.

11. In a vehicle of the character described: a wheeled frame structure including a top wall and side walls defining a load carrying chamber; adjustable mast structures depending from said top wall adjacent said side walls, each of said mast structures including a load engaging slide member supported thereon for raising and lowering movement; reversible rotary fluid pressure operated power means having a driving connection with said slide members, and a pair of terminal connections for a pressurized operating fluid, one of said connections being a fluid inlet for operation of the power means in a slide raising direction, and the other a fluid inlet for slide lowering operation; a check valve in the flow path of said one of said connections; a restricted flow path shunting said check valve; braking means normally biased to a braking position with respect to said power means, when said power means are deenergized; and means responsive to the selective supplying of fluid under pressure to said terminal connections for actuating said braking means to non-braking position.

References Cited in the file of this patent

UNITED STATES PATENTS

| | | |
|---|---|---|
| 2,410,965 | Dimick | Nov. 12, 1946 |
| 2,583,075 | Anderson et al. | Jan. 22, 1952 |
| 2,616,580 | Olson | Nov. 4, 1952 |
| 2,656,942 | Helms | Oct. 27, 1953 |
| 2,862,635 | Christenson et al. | Dec. 2, 1958 |
| 2,925,930 | Parks | Feb. 23, 1960 |